(12) United States Patent
Naribole et al.

(10) Patent No.: US 11,723,006 B2
(45) Date of Patent: Aug. 8, 2023

(54) SHARED TRANSMISSION OPPORTUNITY OPERATION IN MULTI-ACCESS POINT COORDINATION

(71) Applicant: Samsung Electronics Co., Ltd., Gyeonggi-do (KR)

(72) Inventors: Sharan Naribole, San Jose, CA (US); Srinivas Kandala, Morgan Hill, CA (US); Wook Bong Lee, San Jose, CA (US); Ashok Ranganath, Los Gatos, CA (US)

(73) Assignee: Samsung Electronics Co., Ltd

( * ) Notice: Subject to any disclaimer, the term of this patent is extended or adjusted under 35 U.S.C. 154(b) by 137 days.

(21) Appl. No.: 17/158,846

(22) Filed: Jan. 26, 2021

(65) Prior Publication Data

US 2021/0289499 A1    Sep. 16, 2021

Related U.S. Application Data

(60) Provisional application No. 62/989,097, filed on Mar. 13, 2020.

(51) Int. Cl.
| | |
|---|---|
| *H04L 12/28* | (2006.01) |
| *H04W 72/0453* | (2023.01) |
| *H04J 1/16* | (2006.01) |
| *H04W 88/08* | (2009.01) |

(52) U.S. Cl.
CPC ........ *H04W 72/0453* (2013.01); *H04W 88/08* (2013.01)

(58) Field of Classification Search
CPC ............. H04L 5/0007; H04W 28/20; H04W 72/0433; H04W 72/0453; H04W 84/12; H04W 88/08
USPC .......................................... 370/252, 329, 430
See application file for complete search history.

(56) References Cited

U.S. PATENT DOCUMENTS

| | | | |
|---|---|---|---|
| 9,628,151 B2 | 4/2017 | Hessler et al. | |
| 10,687,226 B2 | 6/2020 | Bahr | |
| 2017/0188336 A1* | 6/2017 | Ahn ................. | H04W 74/0858 |
| 2019/0246354 A1* | 8/2019 | Huang .............. | H04W 52/0229 |
| 2020/0008471 A1 | 3/2020 | Wu et al. | |
| 2020/0120544 A1 | 4/2020 | Liu et al. | |
| 2020/0245352 A1* | 7/2020 | Seok ................. | H04W 72/0433 |
| 2021/0058936 A1* | 2/2021 | Gordaychik ........ | H04W 72/085 |

FOREIGN PATENT DOCUMENTS

EP         3123759          5/2019

\* cited by examiner

*Primary Examiner* — John Pezzlo
(74) *Attorney, Agent, or Firm* — The Farrell Law Firm, P.C.

(57) ABSTRACT

Disclosed is a method of setting conditions for an access point (AP) to be included in an AP candidate set of a coordinating AP for a transmission opportunity (TXOP), including setting a first primary channel of the AP as part of the AP candidate set of the coordinating AP within a basic service set (BSS) operating bandwidth of the coordinating AP, and coordinating AP updates in the AP candidate set when a coordinated AP that is part of the AP candidate set performs a channel switch to a second primary channel operating on a different bandwidth stream than a bandwidth stream of the first primary channel.

10 Claims, 3 Drawing Sheets

SHARED TRANSMISSION OPPORTUNITY OPERATION IN MULTI-ACCESS POINT COORDINATION

PRIORITY

This application is based on and claims priority under 35 U.S.C. § 119(e) to U.S. Provisional Application Ser. No. 62/989,097, which was filed in the U.S. Patent and Trademark Office on Mar. 13, 2020, the contents of which are incorporated herein by reference.

BACKGROUND

1. Field

The disclosure relates generally to access point (AP) configuration in wireless communication, and more particularly, to an apparatus and a method of configuring an AP candidate set, shared AP selection and coordination for a shared transmission opportunity (TXOP) operation in multi-AP coordination in a next-generation communication system.

2. Description of Related Art

Multi-AP coordination is a key feature of the next-generation institute of electrical and electronics engineers (IEEE) 802.11be standard.

There are several categories of multi-AP coordination, including but not limited to joint processing, coordinated orthogonal frequency division multiple access (OFDMA), null forming, coordinated beamforming, and AP selection. An extreme high throughput (EHT) AP supporting the multi-AP coordination can send a beacon or another management frame including capabilities of multi-AP transmission schemes. In both the downlink (DL) and the uplink (UL), the utilized APs may vary per frame based on such factors as link quality and load balancing.

There are coordinating APs and coordinated APs in multi-AP coordination. An AP that is capable of initiating multi-AP coordination is known as the coordinating AP, hereinafter referred to as a sharing AP when appropriate. Specifically, a sharing AP and a shared AP, described below, relate to a shared transmission opportunity. Not every AP can be a sharing AP. An AP that is capable of initiating multi-AP coordination is referred to as a coordinating AP. If the AP cannot initiate but can participate in multi-AP coordination, the AP is referred to as a coordinated AP. The coordinating AP can be a sharing AP or a shared AP; however, the coordinated AP can only be a shared AP and cannot be a sharing AP.

The coordinating AP advertises its multi-AP coordination capability in a beacon, for example. Meanwhile, the AP that is capable of participating in multi-AP coordination is known as the coordinated AP, hereinafter referred to as a shared AP. This AP responds to the advertisement to become part of the AP candidate set of the sharing AP. A coordinated AP can be part of AP candidate sets of different coordinating APs.

An AP candidate set is maintained by each coordinating AP and may be different for each multi-AP transmission mode supported by a coordinated AP due to such requirements as basic service set (BSS) operation and coordination complexity.

The coordinating APs of an AP candidate set can request for resources from the coordinating AP. Specifically, upon obtaining a transmission opportunity (TXOP the updated AP determines whether it may share the TXOP with one or more shared APs from its AP candidate set. This TXOP is denoted as a shared TXOP (SH-TXOP) in which multi-AP coordination is performed. The coordinating AP which obtains the TXOP and initiates the multi-AP coordination is a sharing AP in reference to this TXOP; accordingly, this TXOP is referred to as a shared TXOP.

The sharing AP initiates the SH-TXOP by transmitting an SH-TXOP announcement frame in a non-HT duplicate physical protocol data unit (PPDU) on every 20 megahertz (MHz) channel of the obtained TXOP bandwidth. Shared APs may not have a primary 20 MHz channel coinciding with the primary 20 MHz channel of the sharing AP. The announcement frame includes a frequency resource, a temporary primary channel of each shared AP, lengths, and additional transmission vector (TXVECTOR) parameters for DL and UL transmission. A sharing AP does not allocate the resource units (RUs) for the stations (STAs), otherwise known as wireless or electronic devices, associated with the shared APs. Instead, each AP assigns RUs to its associated STAs by existing RU allocation procedures for non-associated STAs. UL and DL TX alignment may be required across APs to mitigate adjacent channel interference.

FIG. 1 illustrates a shared TXOP operation 100 according to the prior art.

In FIG. 1, the sharing AP 110 operates on 80 MHz (i.e., 20 MHz_A, 20 MHz_B, 20 MHz_C, 20 MHz_D) and it is assumed that the sharing AP 110 operates on the primary 20 MHz_B channel frame. The shared AP 120 operates on the same 80 MHz channel but on a different primary 20 MHz channel (i.e., 20 MHz_C channel). When the sharing AP 110 achieves the medium access, the sharing AP 110 transmits the SH-TXOP announcement (SH-TXOP ANN) frame 150 in a non-HT duplicate PPDU format, such that the other APs being allocated resources will learn about the resource allocation. The shared AP 120 decodes the SH-TXOP ANN frame 150 and understands that it has been allocated the 20 MHz_C and 20 MHz_D channels for the SH-TXOP, including the DL OFDMA 130 and UL OFDMA 140 frames. This DL OFDMA 130 transmission is initiated after a short interframe space (SIFS) and is proceeded by a UL OFDMA 140 acknowledgement and data transmissions.

Once the shared AP 120 receives the SH-TXOP ANN frame 150, the sharing AP 110 and shared AP 120 both transmit on non-overlapping channels. In other words, the sharing AP 110 transmits DL OFDMA 130 and UL ODFMA 140 frames on the 20 MHz_A and 20 MHz_B channels, while the shared AP 120 transmits DL OFDMA 130 and UL OFDMA 140 frames on the 20 MHz_C and 20 MHz_D channels.

Based on the example illustrated in FIG. 1, if the shared AP 120 operated on a different frequency, such as 160 MHz, instead of 80 MHz and the primary 20 MHz channel was different than the 20 MHz TXOP bandwidth of the sharing AP 110, a problem would arise in that the shared AP 120 would not receive the SH-TXOP ANN frame 150.

In addition, from a practical standpoint, there tends to be a group of APs serving users, which presents the need for parameters to determine not only how an AP may become part of the AP candidate set, but also, once the transmission opportunity is obtained by the sharing AP, which APs can be selected by the sharing AP for the coordination.

Moreover, it is possible that multiple APs may be using the same primary channel. If so, then the shared AP has to temporarily switch its primary channel to another channel, in order to prevent channel interference.

As such, there is a need in the art for a more efficient multi-AP coordination, in which protocols are defined for AP candidate set maintenance, enablement of a temporary primary channel switch, and shared AP selection for a particular SH-TXOP in a next-generation communication system.

SUMMARY

The present disclosure has been made to address at least the above-mentioned problems and/or disadvantages and to provide at least the advantages described below.

Accordingly, an aspect of the present disclosure is to provide conditions for participating as a shared AP in the AP candidate set of a sharing AP.

Another aspect of the present disclosure is to provide an efficient protocol and frame design for a shared AP and associated STAs or devices to temporarily switch their primary channel for the duration of an SH-TXOP.

In accordance with an aspect of the present disclosure, a method of setting conditions for an AP to be included in an AP candidate set of a coordinating AP for a TXOP includes setting a first primary channel of the AP as part of the AP candidate set of the coordinating AP within a basic service set (BSS) operating bandwidth of the coordinating AP, and coordinating AP updates in the AP candidate set when a coordinated AP that is part of the AP candidate set performs a channel switch to a second primary channel operating on a different bandwidth stream than a bandwidth stream of the first primary channel.

In accordance with another aspect of the disclosure, a method of setting conditions for a sharing AP to select a shared AP from an AP candidate set of the sharing AP for an SH-TXOP, includes selecting, by the sharing AP, an AP as the shared AP if a bandwidth of a primary channel of the AP is within a bandwidth of the SH-TXOP, and restricting, by the sharing AP, allocation to any shared AP in the AP candidate set of time resources beyond a duration of the SH-TXOP and frequency resources outside of the SH-TXOP bandwidth.

In accordance with another aspect of the disclosure, a method of a SH-TXOP switching includes simultaneously transmitting an SH-TXOP switch of a plurality of SH-TXOP switches by a plurality of shared APs, each of the SH-TXOP switches containing identical content; and including, by a sharing AP, in an SH-TXOP announcement frame, information regarding whether an SH-TXOP switch frame will be transmitted by the plurality of shared APs.

In accordance with another aspect of the disclosure, a method of associating a STA with a shared AP in an SH-TXOP includes generating temporal security keys with a sharing AP having an AP candidate set that includes the shared AP.

In accordance with another aspect of the disclosure, a STA is connected to a shared AP and includes a memory, and a processor coupled with the memory and configured to perform at least one operation on a first primary channel, receive notification, from the shared AP, of a temporarily switch to a second primary channel operating on a different bandwidth stream than a bandwidth stream of the first primary channel, and temporarily switch to the second primary channel, based on the notification.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
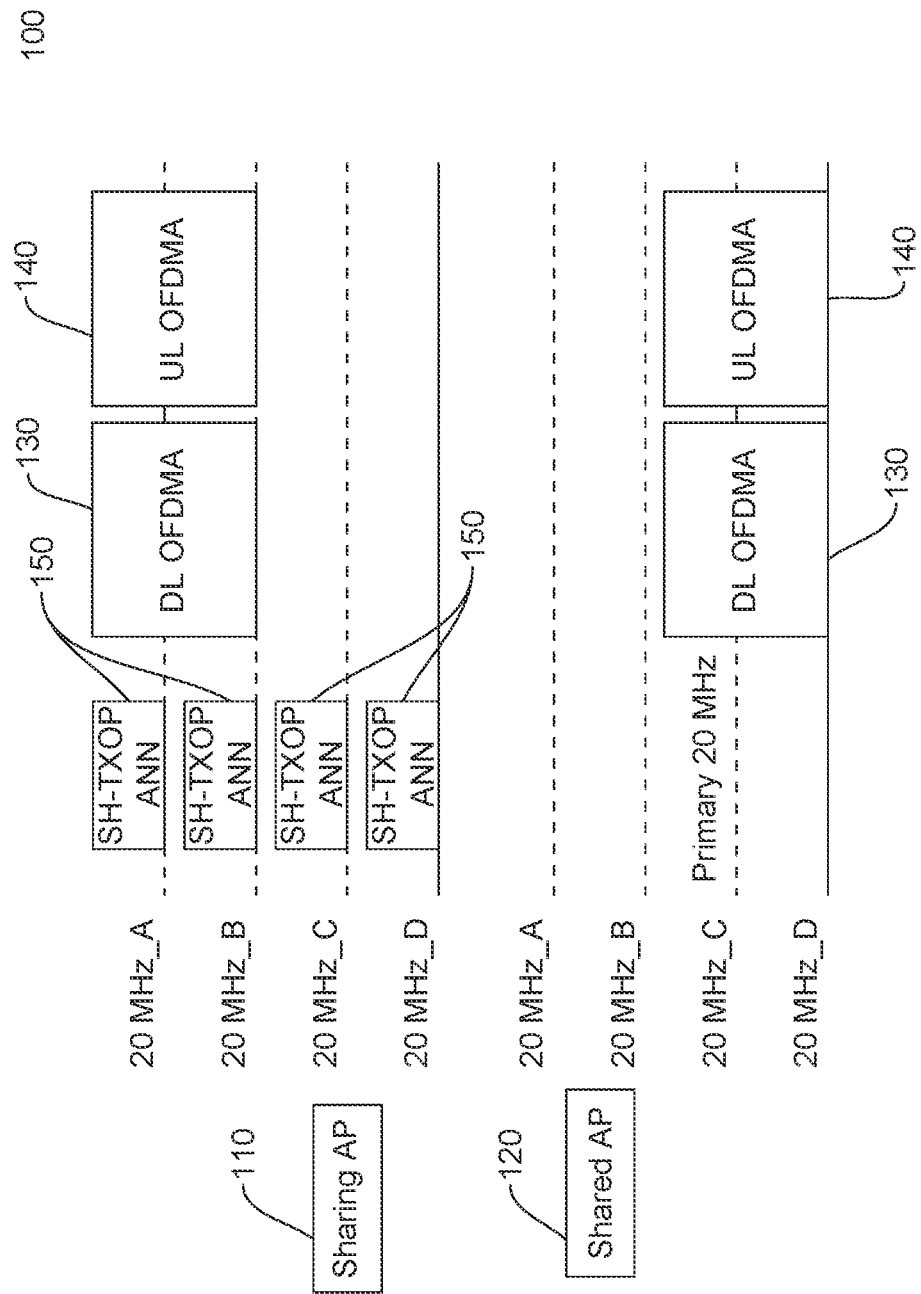
FIG. 1 illustrates a shared TXOP operation 100 according to the prior art.

Embodiments of the present disclosure will be described herein below with reference to the accompanying drawings. However, the embodiments of the present invention are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The STAs or devices according to one embodiment may be one of various types of electronic devices having a memory and a processor coupled with the memory and being configured to perform functions of the device, including, but not limited to, a portable communication device (e.g., a smart phone), a computer, a portable multimedia device, a portable medical device, a camera, a wearable device, or a home appliance.

The disclosure is directed to configuring an AP candidate set, shared AP selection and coordination for a shared TXOP operation in multi-AP coordination. If the shared AP has a primary 20 MHz bandwidth that resides outside of the bandwidth of the SH-TXOP, the shared AP would not receive the SH-TXOP announcement frame. In the disclosure, therefore, the primary 20 MHz bandwidth of a shared (i.e., coordinated) AP belonging to an AP candidate set of a sharing (i.e., coordinating) AP shall lie within the BSS (network) operating bandwidth of the sharing AP, the primary 20 MHz bandwidth of a shared AP shall lie within the SH-TXOP bandwidth, and the sharing AP shall not allocate, to any shared AP, time resources beyond the duration of the SH-TXOP and frequency resources outside of a corresponding SH-TXOP bandwidth.

Further in the disclosure, the sharing AP updates its' AP candidate set when a shared AP that belongs to the AP candidate set of the sharing AP performs a channel switch, such that the new primary channel of the shared AP resides outside of the BSS operation bandwidth stream of the sharing AP.

Figure 2:
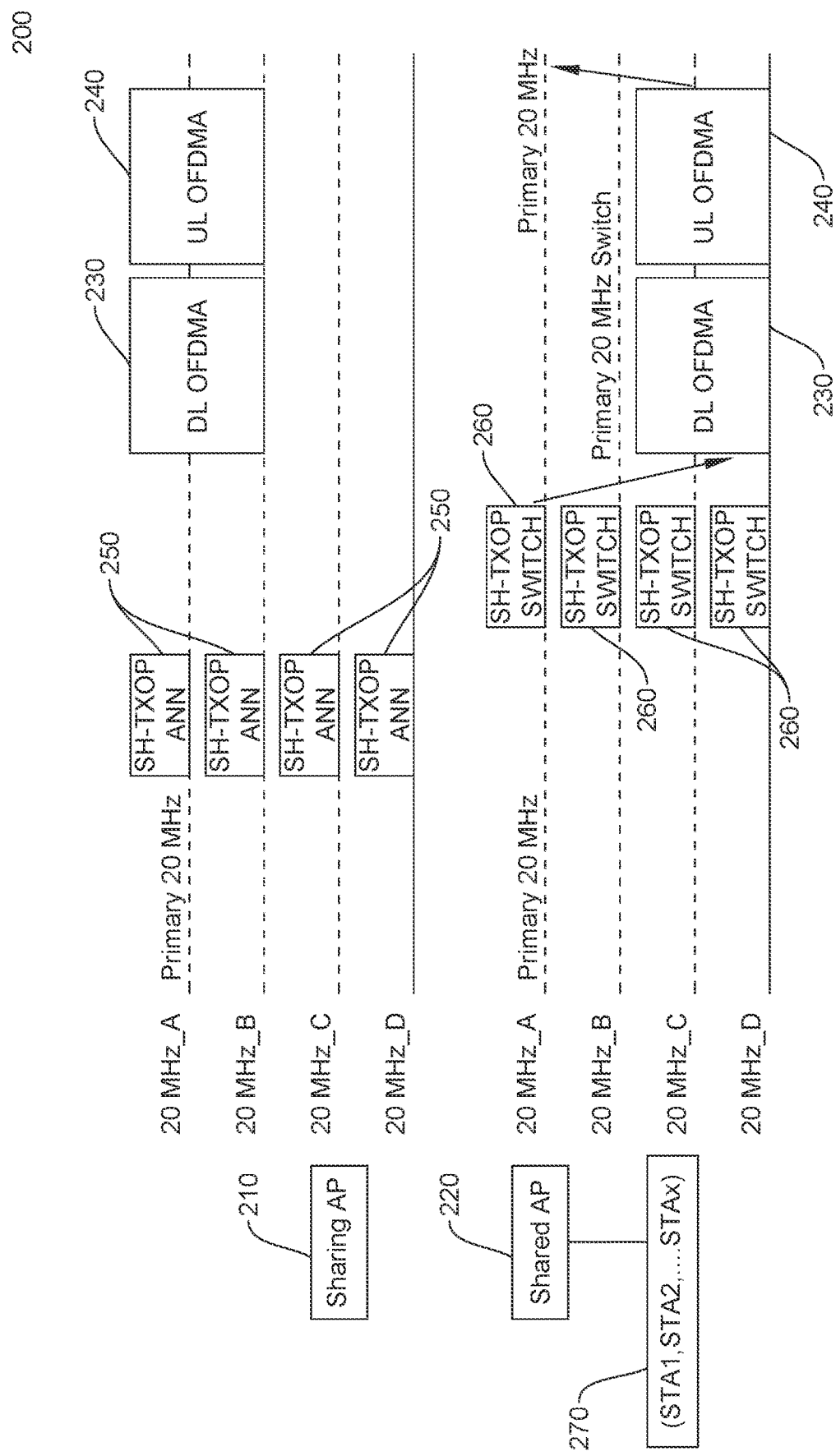
FIG. 2 illustrates switching of a primary channel, by a shared AP, in an SH-TXOP switch frame operation 200 according to an embodiment.

FIG. 2 illustrates switching of a primary channel, by a shared AP, in an SH-TXOP switch frame operation 200 according to an embodiment.

In FIG. 2, a sharing AP 210 and a shared AP 220 have the same primary 20 MHz channel, i.e., 20 MHz_A. The SH-TXOP ANN frame 250 sent by the sharing AP 210 is received by the shared AP 220 on the 20 MHz_A channel. However, the resources of the shared AP 220 cannot be allocated on the same channel as the sharing AP 210. Accordingly, the shared AP 220 temporarily switches its primary 20 MHz channel to a different bandwidth stream, i.e., 20 MHz_D, based on the SH-TXOP SWITCH frame 260.

Specifically, in a shared TXOP, it may be necessary for a shared AP 220 to temporarily switch its primary 20 MHz channel until the end of the SH-TXOP. In this case, a primary 20 MHz_A channel of the shared AP 220 coincides with the primary 20 MHz_A channel of the sharing AP 210 or other shared APs. Such shared APs need to indicate a temporary channel switch to one or more associated EHT STAs 270 or devices. The STAs 270 of the shared AP 220 need to perform the temporary primary channel switch but may not hear or receive the SH-TXOP ANN 250 from the sharing AP 210 since the primary 20 MHz channel of the shared AP 220 is outside of coverage due to the primary 20 MHz channel switch to the 20 MHz_D channel. Also, the SH-TXOP ANN frame 250 may not be received by the STAs 270 of the shared AP 220, although in the same coverage area as the sharing AP 210, since the STAs 270 associated with the shared AP 220 may not be hearing the signals of the other APs.

In other words, it can only be presumed that the associated AP of a STA, such as a STA of the sharing AP 210 or a STA of the shared AP 220, can reliably hear the signal of its own AP, not the signal of the other AP. Thus, it cannot be presumed that a STA of the shared AP 220 listens to the SH-TXOP ANN frame 250 of the sharing AP 210. As such, the SH-TXOP SWITCH frame 260 is provided to enable the STAs 270 of the shared AP 220 to perform the switch to the primary 20 MHz_D channel. In this manner, the STAs 270 of the shared AP 220 may perform transmissions of the DL OFDMA 230 and UL OFDMA 240 resources on the shared AP 220.

As seen in FIG. 2, the center frequency of 80 MHz and the BSS operating bandwidth of 20 MHz for each channel remains the same for the sharing AP 210 and shared AP 220.

In the instance of FIG. 2, therefore, the SH-TXOP SWITCH frame 260 transmitted simultaneously by shared APs shall be identical in terms of all of the content in the frames, in order to avoid collision at the STAs 270. In other words, the content in one switch is identical to the content in any other switch. The SH-TXOP SWITCH 260 is transmitted in a non-HT duplicate PPDU format by the shared AP 220 on each 20 MHz channel of its BSS operation within the 80 MHz SH-TXOP bandwidth. Even a shared AP that does not perform the primary channel switch transmits the SH-TXOP SWITCH frame 260 in order to retain channel access and to prevent the STAs 270 from transmitting on the same bandwidth stream. The SH-TXOP ANN frame 250 shall include information indicating whether the SH-TXOP SWITCH frame 260 shall be transmitted by the shared AP 220. That is, the shared AP 220 may not transmit the SH-TXOP SWITCH frame 260. This indication is provided because, in some allocations, there may be no shared APs performing a switch. In that case, no switch frame is transmitted from any shared AP and OFDMA transmissions can begin immediately after the SH-TXOP ANN frame, as in FIG. 1.

In FIG. 2, shared AP 220 does not know whether any other shared AP is performing a switch. Therefore, this indication enables shared APs which are not performing a switch to know whether any other shared APs are performing a switch. Accordingly, the OFDMA transmissions can begin after the switch frame transmissions if there is no switch involved in this SH-TXOP.

The duration field in the SH-TXOP SWITCH frame 260 is set to the end of the SH-TXOP for legacy STAs NAV update. To reduce overhead, the SH-TXOP SWITCH frame 260 shall include only information essential for EHT STAs 270 of the shared AP 220, such as the primary channel and bandwidth, and is significantly shorter in length than the SH-TXOP ANN frame 250, as illustrated in FIGS. 2 and 3.

Figure 3:
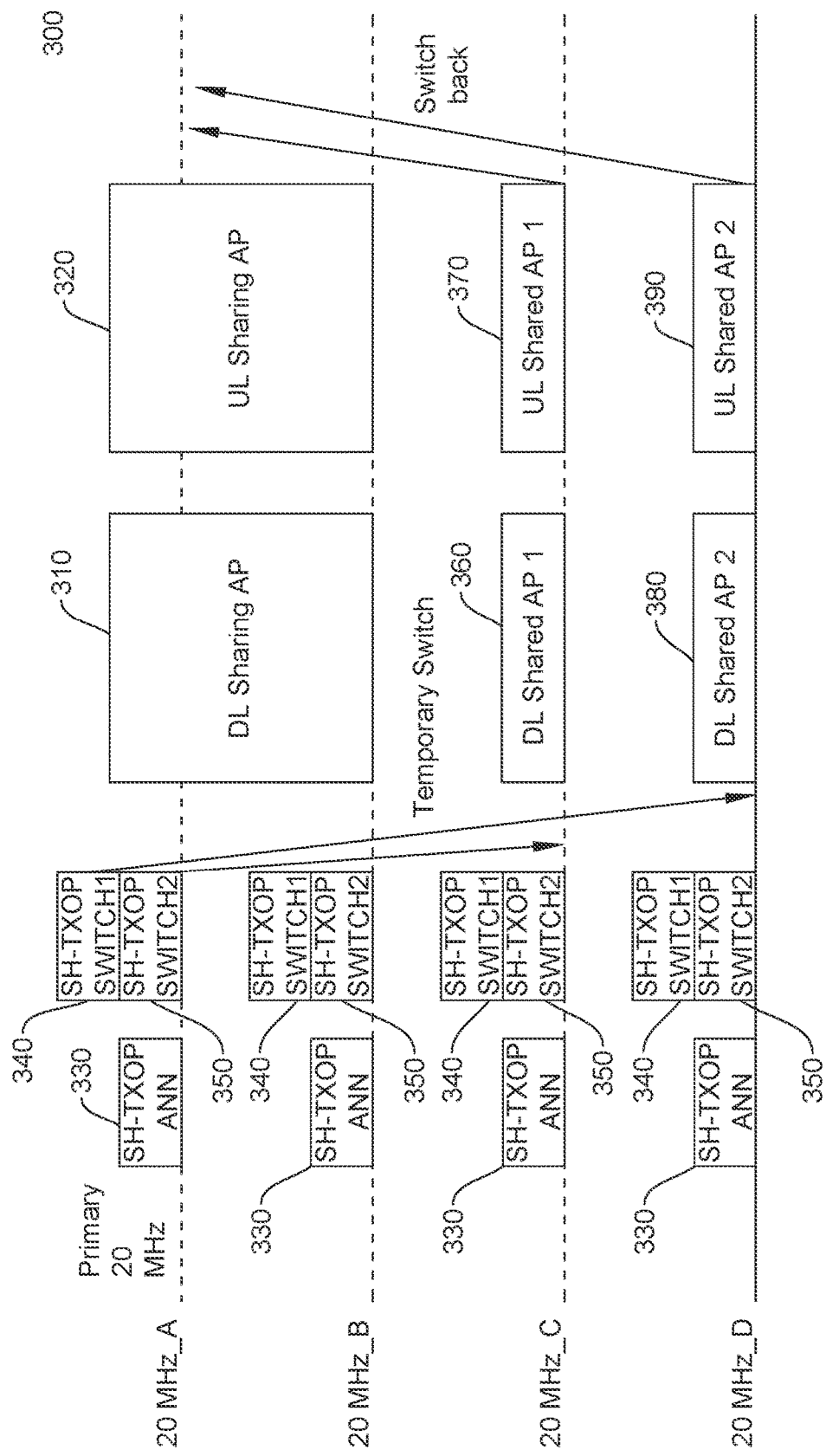
FIG. 3 illustrates switching of a primary channel, by a plurality of shared APs, in an SH-TXOP switch frame operation 300 according to an embodiment.

FIG. 3 illustrates switching of a primary channel, by a plurality of shared APs, in an SH-TXOP switch frame operation 300 according to an embodiment.

In FIG. 3, there are two shared APs, i.e., AP1 and AP2. However, this configuration is merely for illustration purposes, and there may be any number of shared APs in this operation. Shared AP1 includes a DL shared AP1 360 and a UL shared AP1 370, and shared AP2 includes DL shared AP2 380 and UL shared AP2 390. There is also a sharing AP including a DL sharing AP 310 and UL sharing AP 320, operating on the primary 20 MHz_A channel. It is assumed that both of shared AP1 and shared AP2 also initially operate on the primary 20 MHz_A channel. However, once the SH-TXOP ANN frame 330 is sent, this frame indicates to shared AP1 and shared AP2 which temporary primary channel they should be using.

Accordingly, SH-TXOP SWITCH1 340 and SH-TXOP SWITCH2 350 frames are sent by shared AP1 and shared AP2, respectively, causing DL shared AP 1 360 and UL shared AP1 370, as well as DL shared AP2 380 and UL shared AP2 390 and their associated EHT STAs that can decode these frames to perform this temporary switch. It is assumed that the temporary channel switch for shared AP1 including DL shared AP1 360 and UL shared AP1 370 is to the primary 20 MHz_C channel, and that the temporary channel switch for shared AP2 including DL shared AP2 380 and UL shared AP2 390 is to the primary 20 MHz_D channel, is illustrated in FIG. 3. That is, the objective of resource allocation is to prevent interference among the APs. Therefore, the frequency resources used by any AP taking part in this SH-TXOP do not overlap with those of any other AP in this SH-TXOP including shared APs and the sharing AP.

At the conclusion of this SH-TXOP opportunity, shared AP1 including DL shared AP1 360 and UL shared AP1 370 and shared AP2 including DL shared AP2 380 and UL shared AP2 390 switch back to the primary channel bandwidth stream that they were previously using prior to the switch.

As seen in FIG. 3, a sharing AP including DL sharing AP 310 and UL sharing AP 320 and two shared APs including DL shared AP1 360 and UL shared AP1 370 and DL shared AP2 380 and UL shared AP2 390, initially operate on the same primary 20 MHz channel. The sharing AP includes the two shared APs in the SH-TXOP ANN frame 330. Each of shared AP1 and shared AP2 simultaneously transmit the identical SH-TXOP SWITCH1, SH-TXOP SWITCH2. In other words, each of shared AP1 and shared AP2 transmits one switch frame and both are identical in terms of all of the content in these frames.

The sharing AP including DL sharing AP 310 and UL sharing AP 320 and two shared APs including DL shared AP1 360 and UL shared AP1 370 and DL shared AP2 380 and UL shared AP2 390 conduct the DL and UL transmissions accordingly once the switch is completed. In addition, the shared APs switch back to the primary channel on which they operated prior to the SH-TXOP opportunity.

There may be one or more shared APs that do not perform this switch. That is, a shared AP may be operating its primary channel on a different channel than that of the sharing AP, such that no change is indicated in the SH-TXOP ANN frame 330 for such a shared AP.

As described above, an improved multi-AP coordination is realized in that the type of content that should be included in the SH-TXOP SWITCH frame is considered. The SH-TXOP SWITCH frames 340, 350 are identical content-wise for each of the shared APs. If they are different, a STA which is between the coverage of both shared AP1 and shared AP2 may receive a packet sent from both of these APs simultaneously. In this case, these packets may collide. Thus, the present application as described above sets forth the necessity of the switch frames to be identical as to the content in each of these frames.

Specifically, in wireless fidelity (WiFi) frames, the medium access control (MAC) header includes a transmitter address (TA). In the present application, this MAC address of the sharing AP may be reused for the SH-TXOP SWITCH frame by the shared AP. Accordingly, the STAs connected to the shared AP need to know which other APs are in their secured group. When a new STA joins, one of the shared APs already existing in the group may provide information of the other shared APs and their MAC addresses. Thus, if the MAC address of the SH-TXOP SWITCH frame is of the sharing AP, the STA of the shared AP will not discard this MAC address.

As such, the SH-TXOP ANN frame 330 and SH-TXOP SWITCH 340, 350 frames are control frames. A shared AP can share a priori, such as during association, with associated EHT STAs of the AP candidate set of the sharing AP having the reused MAC address. The EHT STAs decode the SH-TXOP SWITCH1 340, SH-TXOP SWITCH2 350 frames with the same TA as that of the MAC address of the sharing AP. The STAs associated with different shared APs need to decrypt the identical SH-TXOP SWITCH frame.

As to security, there is a scalability aspect to the SH-TXOP SWITCH frame security context establishment. In particular, STAs have to generate a group temporal key (GTK) and a GTK of a client's MAC address (GTKSA) with each sharing AP. When a shared AP joins an AP candidate set, each STA has to generate the GTKs with the sharing AP.

Broadcast integrity protocol (BIP) is necessary considering the numerous broadcast streams of the sharing AP and shared AP. To prevent such streams from being interfered with by an outside party, the BIP is used to compute a mixed transfer MAC integrated check (MIC) for multi-AP coordination. This MIC is a binary operation that produces a vector that will be unique for the sent data. The sent data is accompanied by the MIC sequence in the broadcast stream, and the receiver of the data performs the same MIC operation to confirm that the check sequence is correct. If correct, the receiver will confirm the packet. If incorrect, the receiver will drop the packet.

It is obvious that a method according to the disclosure can be realized by hardware, software (i.e., a program), or a combination thereof. Embodiments of the present disclosure can also be embodied as computer-readable codes on a computer-readable recording medium, which may be non-transitory. The computer-readable recording medium is any data storage device that can store data that can thereafter be read by a computer system. Examples of the computer-readable recording medium include, but are not limited to, read-only memory (ROM), random-access memory (RAM), CD-ROMs, magnetic tapes, floppy disks, optical data storage devices. The computer-readable recording medium can also be distributed over network-coupled computer systems so that the computer-readable code is stored and executed in a distributed fashion. Also, function programs, codes, and code segments for accomplishing the present disclosure can be easily construed as within the scope of the disclosure by programmers skilled in the art to which the present disclosure pertains.

While the present disclosure has been described with reference to various embodiments, various changes may be made without departing from the spirit and the scope of the present invention, which is defined, not by the detailed description and embodiments, but by the appended claims and their equivalents.

What is claimed is:

1. A method of setting conditions for an access point (AP) to be included in an AP candidate set of a coordinating AP for a transmission opportunity (TXOP), comprising:
    setting a first primary channel of the AP as part of the AP candidate set of the coordinating AP within a basic service set (BSS) operating bandwidth of the coordinating AP;
    determining that a coordinated AP that is part of the AP candidate set is sharing the first primary channel with the coordinating AP; and
    in response to the determining, coordinating AP updates in the AP candidate set when the coordinated AP performs a channel switch to a second primary channel operating on a different bandwidth stream than a bandwidth stream of the first primary channel.

2. The method of claim 1,
    wherein an operating frequency of the first primary channel is identical to the operating frequency of the second primary channel.

3. The method of claim 2,
wherein the operating frequency of first primary channel and the second primary channel is 20 megahertz (MHz).

4. The method of claim 1,
wherein the channel switch from the first primary channel to the second primary channel is temporary, and
wherein the channel switch is further performed for at least one station (STA) associated with the coordinated AP.

5. The method of claim 4,
wherein the coordinated AP switches back to the bandwidth stream of the first primary channel when the TXOP is concluded.

6. A station (STA) connected to a shared access point (AP) and comprising:
a memory; and
a processor coupled with the memory and configured to:
perform at least one operation on a first primary channel;
determining that the STA is sharing the first primary channel with the shared AP;
in response to the determining, receive notification, from the shared AP, of a temporarily switch to a second primary channel operating on a different bandwidth stream than a bandwidth stream of the first primary channel; and
temporarily switch to the second primary channel, based on the notification.

7. The STA of claim 6,
wherein the STA performs transmission of downlink and uplink orthogonal frequency division multiple access (OFDMA) resources on the second primary channel when the temporary switch is performed.

8. The STA of claim 6,
wherein the notification is received via a shared transmission opportunity (SH-TXOP) SWITCH frame sent by the shared AP.

9. The STA of claim 6,
wherein an operating frequency of the first primary channel is identical to the operating frequency of the second primary channel.

10. The STA of claim 9,
wherein the operating frequency of first primary channel and the second primary channel is 20 megahertz (MHz).

* * * * *